United States Patent [19]
Sugitani et al.

[11] Patent Number: 6,150,631
[45] Date of Patent: Nov. 21, 2000

[54] METHOD OF DETECTING ROOT GAP AND ARC WELDING METHOD USING THE FORMER

[75] Inventors: Yuji Sugitani; Yoshihiro Kanjo; Hitoshi Serizawa, all of Tsu; Masatoshi Murayama, Kawasaki; Naoyuki Gotoh; Daisuke Ozamoto, both of Hisai, all of Japan

[73] Assignee: NKK Corporation, Tokyo, Japan

[21] Appl. No.: 09/381,784

[22] PCT Filed: Mar. 26, 1998

[86] PCT No.: PCT/JP98/01344

§ 371 Date: Nov. 3, 1999

§ 102(e) Date: Nov. 3, 1999

[87] PCT Pub. No.: WO98/43773

PCT Pub. Date: Aug. 10, 1998

[30] Foreign Application Priority Data

Mar. 27, 1997 [JP] Japan .................................... 9-075273
Mar. 27, 1997 [JP] Japan .................................... 9-075275
Dec. 16, 1997 [JP] Japan .................................... 9-346020

[51] Int. Cl.[7] .................................................. B23K 9/095
[52] U.S. Cl. .............................. 219/124.34; 219/125.12
[58] Field of Search ....................... 219/124.34, 125.12, 219/130.21

[56] References Cited

U.S. PATENT DOCUMENTS

5,532,452  7/1996  Lechner et al. ................... 219/124.34
5,938,955  8/1999  Ikeda et al. ....................... 219/124.34

FOREIGN PATENT DOCUMENTS

62-24862   2/1987  Japan .
63-80971   4/1988  Japan .
8-206835   8/1996  Japan .

*Primary Examiner*—Clifford C. Shaw
*Attorney, Agent, or Firm*—Frishauf, Holtz, Goodman, Langer & Chick, P.C.

[57] ABSTRACT

The weld seam tracking and the welding torch height are controlled, the waveform of the welding voltage or the welding current of the arc is detected, the waveform of the above-described welding voltage or welding current under an appropriate welding condition to a reference gap $G_{ref}$ is stored as a reference waveform, the area $|\Delta SG|$ of a deviation part of the detected waveform to the above-described reference waveform is obtained, $\Delta SG$ is obtained by judging the positive and negative of $|\Delta SG|$, the relationship between the value of $\Delta SG$ and the root gap $G$ is experimentally determined in advance, and the root gap $G$ is calculated from the value of $\Delta SG$.

9 Claims, 11 Drawing Sheets

METHOD OF DETECTING ROOT GAP AND ARC WELDING METHOD USING THE FORMER

TECHNICAL FIELD

The present invention relates to a root gap detecting method in an arc welding, and a welding condition control method.

BACKGROUND TECHNOLOGY

Conventionally, a root gap of a groove in the arc welding has been detected using a laser beam sensor or an image pick-up sensor to detect the groove shape considerably forward of the arc during the welding or before the welding is executed, but no technology to detect the gap just below the arc during the welding has been established.

On the other hand, when the welding is executed by an automatic apparatus using a welding robot, etc., an operation program is prepared by an offline programming method before the welding is executed. However, the offline programming is based on the CAD data, and differences are generated between the CAD data and the actual work position and dimensions due to the machining accuracy, the fitting accuracy, the dynamic thermal deformation etc. of the work during the welding. There exist problems of degrading the welding quality such that desired leg length can not be obtained due to the presence of the gap attributable to said difference.

To solve the problems, it has been strongly requested to develop a technology to select an appropriate welding condition and execute the proper welding operation by in-process sensing the fluctuation of the gap.

Generally, in the adaptive control technology on the welding condition, the welding condition database has been priorly constructed by skilled workers, and an appropriate welding condition has been determined before the welding is executed based on the information on the geometrical shape of a member to be welded, and the information such as the leg length. The welding condition during the welding is thus of open loop control. This is attributable to the fact that no technology for in-process sensing the root gap of the groove or the leg length has been established. Though there is a technology to control the welding condition by combining an image processing unit with a laser beam sensor to measure the gap and detect the bead width as a conventional technology, there has been no technology for controlling the welding condition by sensing the gap immediately below the arc during the welding and achieving the feedback to a controller.

Further, in a case of the welding by the automatic apparatus using the welding robot, etc., an operation program is prepared by the offline programming method before the welding is achieved. In the operation program, the starting point and the finishing point of the welding joint which are the operating path points of the robot, and the operating path point of a position changing point, etc., for the interference avoidance processing are calculated based on the CAD data, thus the parameters such as the welding current, the welding voltage, the welding speed and the torch angle which are the welding conditions are allotted to said points.

In executing the welding operation, the welding starting point is detected by a wire-touch sensor, and the welding is executed by achieving the sequential interpolation of the operating path point while achieving the groove tracking control by the arc sensor during the welding because there exists a difference between the dimensions of actual members and the CAD data. However, there is a problem that the change of the parameters for the welding condition accompanied by the interpolation of the operating path point has not been adapted. That is, the feedback routine by the arc sensor, etc. has been available for the operating path point while the welding condition is subjected to the open-loop control without feedback. Thus, there are some cases that the leg length becomes insufficient, and appropriate welding quality becomes difficult to keep if the welding is executed under the unchanged welding condition though there is a gap in the actual member selected from the CAD database which was made before the welding is achieved. Still worse, such a gap is inevitably generated due to the machining accuracy and the fitting accuracy of the work, the dynamic thermal deformation during the welding, etc.

Generally speaking, in the adaptive control, it is possible to express an object to be controlled using a mathematical model, to estimate the dynamic behavior of the object to be controlled based on the mathematical model, and to control keeping the optimum value, but in the welding condition adaptive control, there is a problem that it is very difficult to express the welding phenomenon using only the mathematical model because the parameters are a lot in number, and complicatedly related with each other.

DISCLOSURE OF INVENTION

Accordingly, it is an object of the present invention to detect a gap just below the arc during the welding in process.

To achieve this object, the present invention provides a method for detecting the root gap in the arc welding comprising the steps of:

controlling the weld seam tracking and the welding torch height;

detecting the waveform of the welding voltage or the welding current of the arc;

storing the waveform of the welding voltage or the welding current under an appropriate welding condition as a reference waveform to the reference gap $G_{ref}$;

obtaining the area $|\Delta SG|$ of the deviated part of the detected waveform as the reference waveform;

obtaining $\Delta SG$ by judging the positive and negative of $|\Delta SG|$;

experimentally determining the relationship between the value of $\Delta SG$ and the root gap $G$ in advance; and calculating the root gap $G$ from the value of $\Delta SG$.

When the above-described arc welding process applies the high-speed rotating arc welding process, it is preferable that the process to obtain the area $|\Delta SG|$ is to obtain the area $|\Delta SG|$ of the deviated part of the detected waveform to the reference waveform for one rotation of the arc, and the process to obtain $\Delta SG$ to obtain $\Delta SG$ by judging the positive and negative of the differential waveform $\Delta SG$ from the sign of the integrated value of the deviated part at a rear part of the position of arc rotation.

When the above-described arc welding process is the oscillating arc welding process to oscillate the welding torch in the welding direction, it is preferable that the process to obtain the area $|\Delta SG|$ is to obtain the area $|\Delta SG|$ of the deviated part of the detected waveform to the reference waveform for one oscillation period of the arc, and the process to obtain $\Delta SG$ is to obtain $\Delta SG$ by judging the positive and negative of the differential waveform $\Delta SG$ by the sign of the integrated value of the deviation part in a rear part of the oscillation period.

When the above-described arc welding is the tandem arc welding process, it is preferable that the process to obtain the area |ΔSG| is to obtain the area |ΔSG| of the deviated part of the detected waveform to the reference waveform for each sampling period, and the process to obtain ΔSG is to obtain ΔSG by judging the positive and negative of the differential waveform ΔSG by the sign of the integrated value of the deviated part in the sampling period of a trailing electrode.

Further, the present invention provides an arc welding method comprising the following processes:

controlling the weld seam tracking and the welding torch height;

detecting the waveform of the welding voltage or the welding current of the arc;

storing the waveform of the welding voltage or the welding current under an appropriate welding condition as a reference waveform to the reference gap $G_{ref}$;

obtaining the area |ΔSG| of the deviated part of the detected waveform as the reference waveform;

obtaining ΔSG by judging the positive and negative of |ΔSG|;

experimentally determining the relationship between the value of ΔSG and the root gap G in advance;

calculating the root gap G from the value of ΔSG;

determining the allowable range +Δg1, -Δg2 of the root gap G in achieving the welding under an appropriate welding condition to the reference gap $G_{ref}$;

obtaining the allowable range +ΔS1, -ΔS2 of the differential waveform ΔSG from the relationship between ΔSG and G; and changing the welding condition to the preset appropriate welding condition for the gap of $G=G_{ref}+\Delta g1$ or $G=G_{ref}-\Delta g2$ when ΔSG is deviated from the above-described allowable range.

BEST MODE FOR CARRYING OUT THE INVENTION

Firstly, the principle of a root gap detecting method is described.

1. In a case of high-speed rotating arc welding
(1) Fluctuation of the Welding Voltage Waveform When the Root Gap of the Groove is Fluctuated.

FIG. 1 is a view illustrating an example of the waveform of the welding voltage $V_T$ to be changed as the gap G is changed in the fillet welding by a high-speed rotating arc welding method. Cf, R, Cr and L denote the rotational position of the arc (refer to FIG. 2), and θ in the transverse axis denotes the phase angle of the rotation.

Figure 1A:
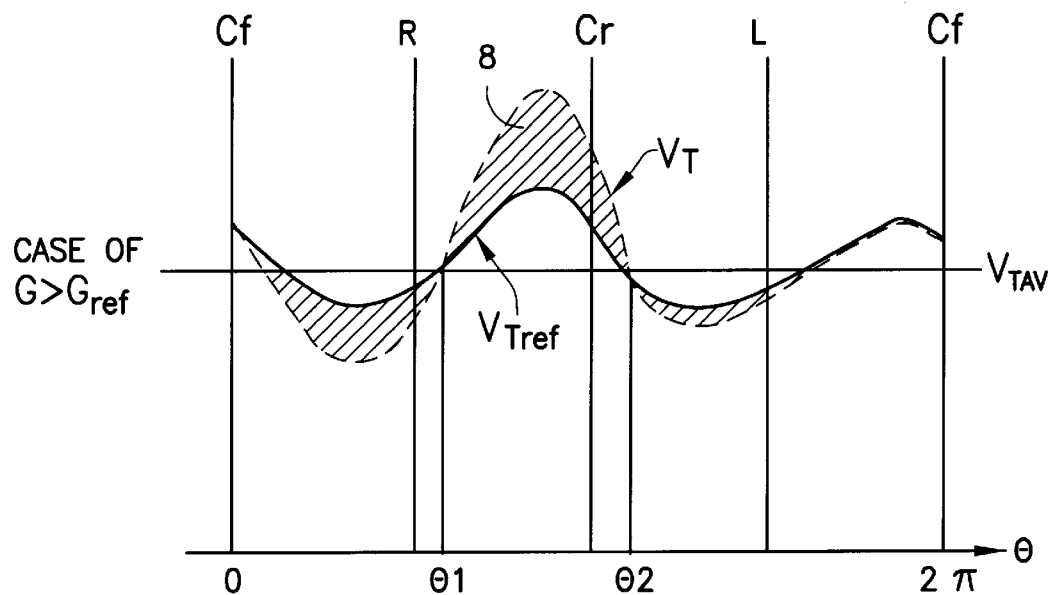
FIG. 1(a) is a waveform chart illustrating the change in the welding voltage of a rotating arc when the root gap G is larger than the reference gap $G_{ref}$ in a case of the high-speed rotating arc welding.
Figure 2:
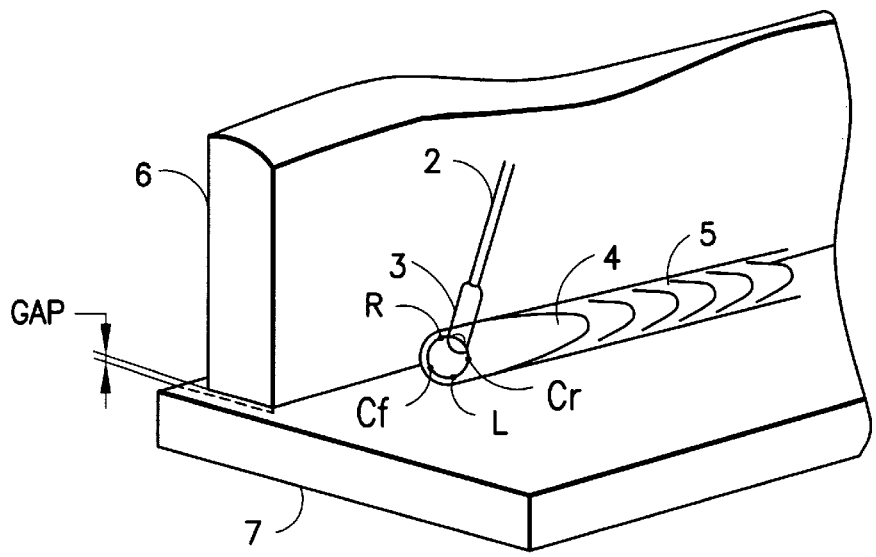
FIG. 2 is a view to define the arc rotational position.

The $V_{Tref}$ (the waveform shown in solid line) in FIG. 1(a) is the reference welding voltage waveform when the welding is achieved under an appropriate welding condition where the gap G is equal to the reference value $G_{ref}$, and $V_{TAV}$ is the average voltage of the $V_{Tref}$ waveform. As for the positions of Cf, R, Cr, and L, the front center position at θ=0° is defined as Cf, the position at θ=90° on the right side is defined as R, the rear center position (at θ=180°) is defined as Cr, and the position at θ=270° on the left side is defined as L, in the welding advancing direction in one rotation of the rotating arc as illustrated in FIG. 2. These positional signals are specified by the pulse signal to be output from an encoder of a rotating motor of a welding torch.

Figure 3A:
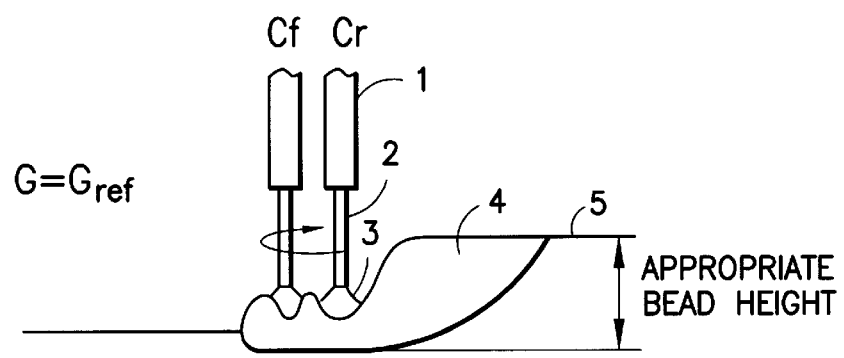
FIG. 3(a) is a schematic representation illustrating the condition of the molten pool when the root gap G is equal to the reference gap $G_{ref}$ in a case of the high-speed rotating arc welding.
Figure 3B:
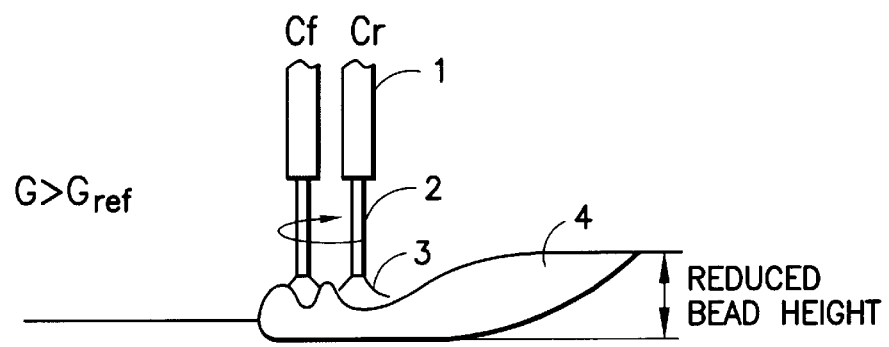
FIG. 3(b) is a schematic representation illustrating the condition of the molten pool when the root gap G is larger than the reference gap $G_{ref}$ in a case of the high-speed rotating arc welding.

The welding voltage waveform becomes higher at the positions Cf and Cr and lowest at the positions of R and L under the effect of the arc length to be changed according to the surface shape of the molten pool. FIG. 1(a) shows the welding voltage waveform as the $V_T$ waveform (broken line) when the gap G becomes larger than $G_{ref}$ in this welding condition. That is, when the gap G is larger than $G_{ref}$, $V_T>V_{Tref}$ in a range of the phase $\theta 1 \sim \theta 2$ at Cr part, while $V_T<V_{Tref}$ in other parts. This is because the leg length (the bead height) is reduced when the gap is increased, a molten pool 4 just below the arc 3 is retreated, then the arc voltage is increased as illustrated in FIG. 3. The average voltage is kept constant by controlling the height of a welding torch 1, then the arc voltage of other parts is decreased.

Figure 1B:
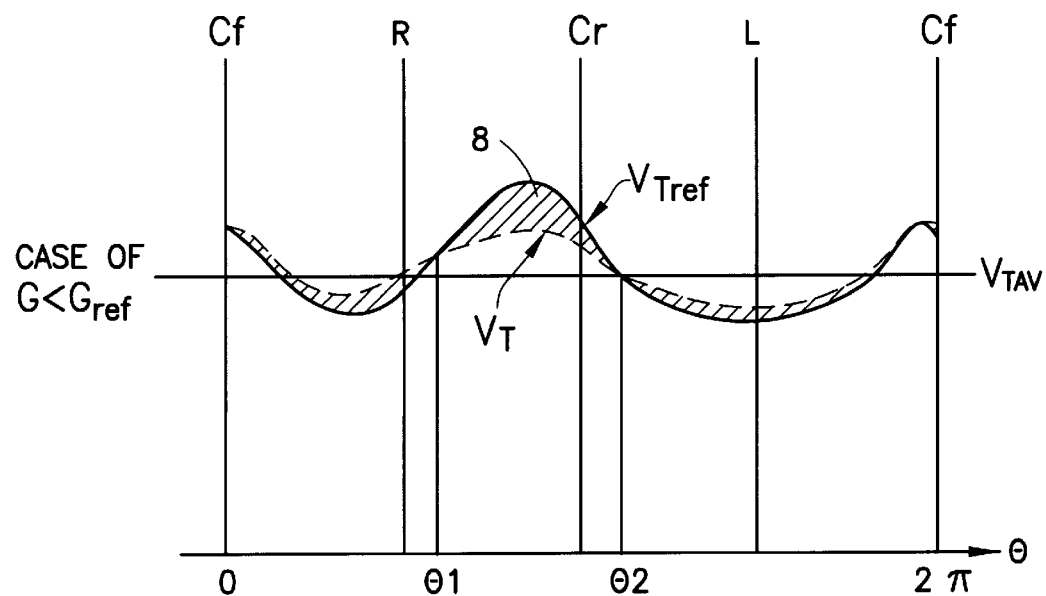
FIG. 1(b) is a waveform chart illustrating the change in the welding voltage of a rotating arc when the root gap G is smaller than the reference gap $G_{ref}$ in a case of the high-speed rotating arc welding.

On the other hand, when the gap G becomes smaller than $G_{ref}$, $V_T<V_{Tref}$ at Cr part while $V_T>V_{Tref}$ at other parts as illustrated in FIG. 1(b). In FIGS. 2 and 3, 1 denotes a welding torch, 2 denotes a welding wire, 3 denotes an arc, 4 denotes a molten pool, 5 denotes a welding bead, 6 denotes a vertical plate, and 7 denotes a flat plate.

(2) Detecting Method of Differential Waveform $\Delta SG$

The result in FIG. 1 shows that the change in the root gap at a part just below the arc can be detected by detecting the welding voltage waveform, i.e., by the arc sensor system without using any other detector during the welding.

The total area for the deviated part (the shadowed part 8 in FIG. 1) of the present waveform $V_T$ from the reference welding voltage waveform $V_{Tref}$ for one rotation of the rotating arc, can be recognized as the absolute value of the change in the gap to the reference gap $G_{ref}$. Further, $G>G_{ref}$ can be judged when the sign of the integrated value of the deviation part of the voltage waveform at the phase $\theta 1 \sim \theta 2$ (Cr part) is positive, and $G<G_{ref}$ when the sign is negative. Not the instantaneous value but the integrated value of the voltage waveform is adopted to prevent the influence of the harmonic noise caused by the welding arc phenomenon.

In the above-described explanation, the voltage waveform is used, but it is natural that the current waveform can be also used from the well-known principle of the arc sensor, but the method to use the current waveform is omitted here.

(3) How to Obtain the Differential Waveform $\Delta SG$

The total area $|\Delta SG|$ of the shadowed part 8 in FIG. 1 is described as follows.

$$|\Delta SG|=\int_0^{2\pi}|V_T-T_{Tref}|d\theta \qquad (1)$$

The integrated value $I_{cr}$ of the deviation part at Cr part is described as follows.

$$I_{cr}=\int_{\theta 1}^{\theta 2}(V_T-V_{Tref})d\theta \qquad (2)$$

Thus, the positive and negative of $\Delta SG$ can be determined from the sign of $I_{cr}$. That is, If $I_{cr}>0$, $\Delta SG>0$
If $I_{cr}<0$, $\Delta SG<0$
Therefore,
$I_{cr}>0$ $$\Delta SG=+\int_0^{2\pi}|V_T-V_{Tref}|d\theta \qquad (3)$$

If $I_{cr}<0$ $$\Delta SG=-\int_0^{2\pi}|V_T-V_{Tref}|d\theta \qquad (4)$$

The value of the differential waveform $\Delta SG$ can be obtained from the formulae (3) and (4). However, in the actual voltage waveform, the phases $\theta 1$ and $\theta 2$ are fairly fluctuated for each rotation of the rotary arc, or the welding condition or the gap value, then it is not easy to detect those phases in process. They are thus given as an approximate value from the result of the practical experiment.

According to said calculation method of $\Delta SG$, the variance of $\theta 1$ and $\theta 2$ does not affect the value of $\Delta SG$, and the accuracy of detection becomes excellent.

(4) Method for Recognizing the Root Gap

Figure 4:
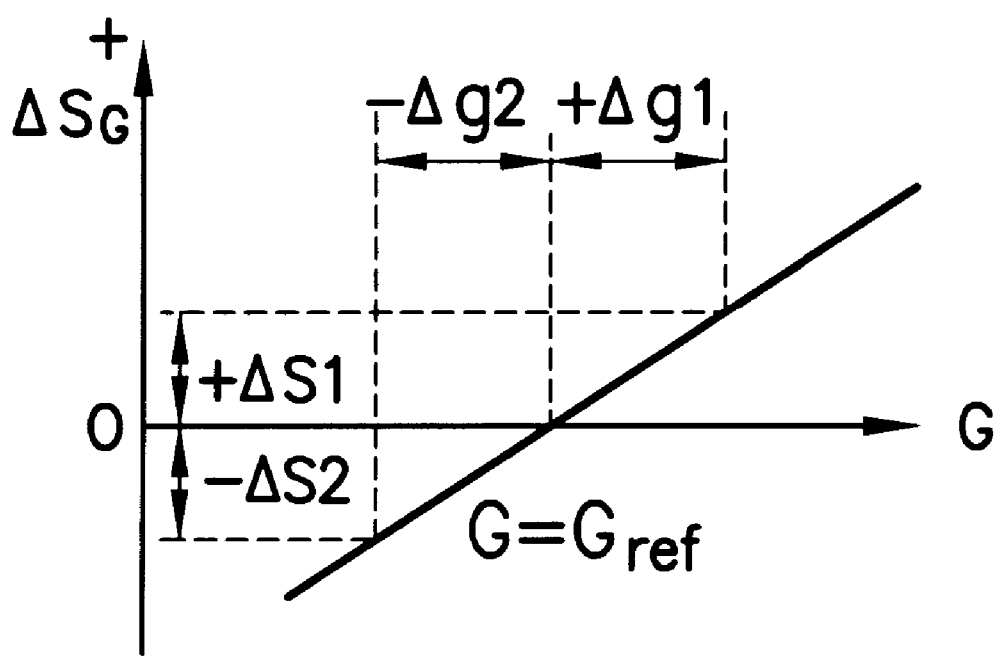
FIG. 4 is a ΔSG–G characteristic diagram illustrating the relationship between the differential waveform Δ SG and the root gap G.

It is experimentally confirmed that the value of $\Delta SG$ obtained by the formula (3) corresponds to the change in the gap, and is in an approximately linear relationship to the root gap G as illustrated in FIG. 4. The $\Delta SG-G$ characteristic curve is obtained in achieving the welding under an appropriate condition at $G=G_{ref}$. Thus, the present root gap can be recognized from the value of $\Delta SG$.

The principle of the oscillating arc welding and the tandem arc welding is similar to that of the high-speed rotating arc welding.

2. In a Case of Oscillating Arc Welding (1) Change of the Welding Voltage Waveform When the Root Gap of the Groove is Fluctuated In a case of the oscillating arc welding, the welding torch is oscillated back and forth in the welding direction, and the voltage waveform to be detected by the arc sensor is illustrated in FIG. 5, and can be similarly and basically handled to the case of the high-speed rotating arc welding.

Figure 5A:
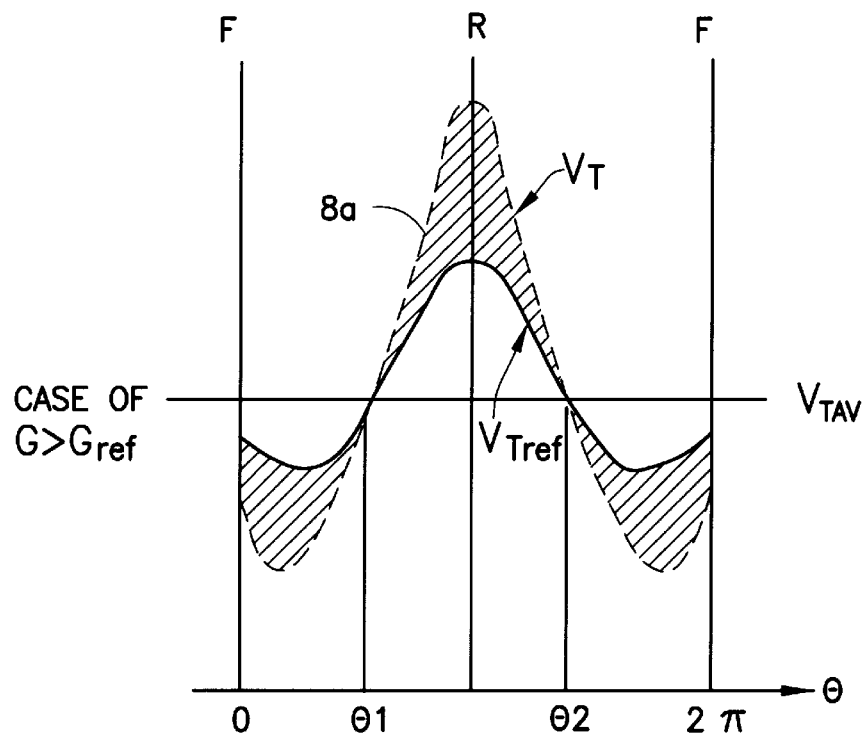
FIG. 5(a) is a waveform chart illustrating the change in the welding voltage of an oscillating arc when the root gap G is larger than the reference gap $G_{ref}$ in a case of the oscillating arc welding.

FIG. 5 illustrates an example of the waveform of the welding voltage $V_T$ to be changed by the change in the gap G in the fillet welding by the oscillating arc welding. In the figure, F, and R denote the positions of the oscillating arc (refer to FIG. 6), and $\theta$ in the axis of welding direction denotes the phase of the welding voltage waveform. The $V_{Tref}$ waveform (the waveform shown by the solid line) in FIG. 5(a) is the reference welding voltage waveform in achieving the welding under an appropriate welding condition when the value of the gap G is equal to the reference value $G_{ref}$, and $V_{TAV}$ is the average voltage of the $V_{Tref}$ waveform. The positions of F and R correspond to the front and rear position respectively, in one oscillation period of the oscillating arc as illustrated in FIG. 6. These positional signals are determined by the pulse signal to be output from an encoder of an oscillation motor of the welding torch.

Figure 7A:
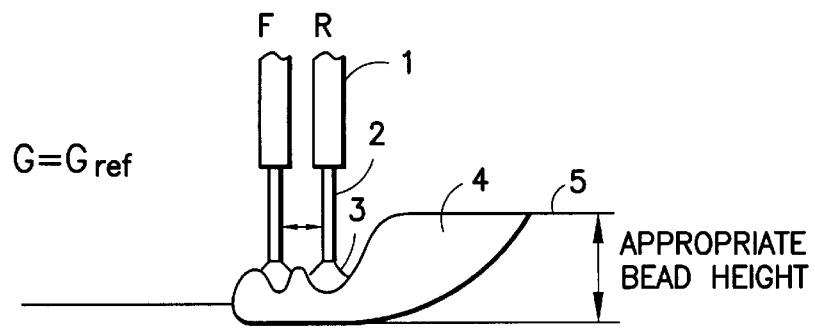
FIG. 7(a) is a schematic representation illustrating the condition of the molten pool when the root gap G is equal to the reference gap $G_{ref}$ in a case of the oscillating arc welding.
Figure 7B:
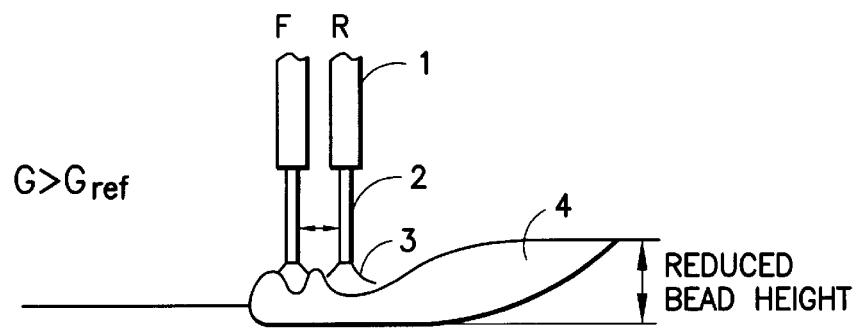
FIG. 7(b) is a schematic representation illustrating the condition of the molten pool when the root gap G is larger than the reference gap $G_{ref}$ in a case of the oscillating arc welding.

The welding voltage waveform becomes highest at the R position under the influence of the arc length to be changed according to the surface shape of the molten pool. Under said welding condition, the welding voltage waveform when the gap G is larger than $G_{ref}$ is illustrated in FIG. 5(a) as the $V_T$ waveform (broken line). That is, when the gap G is larger than $G_{ref}$, $V_T>V_{Tref}$ in the range of the phase $\theta 1 \sim \theta 2$ at R part, and $V_T<V_{Tref}$ in other parts. This is because the leg length (bead height) is decreased when the gap is increased, the molten pool 4 just below the arc 3 is retreated, and the arc voltage at R part is increased, as indicated in FIG. 7. The average voltage becomes constant by controlling the height of the welding torch 1, and the arc voltage of other parts is decreased.

Figure 5B:
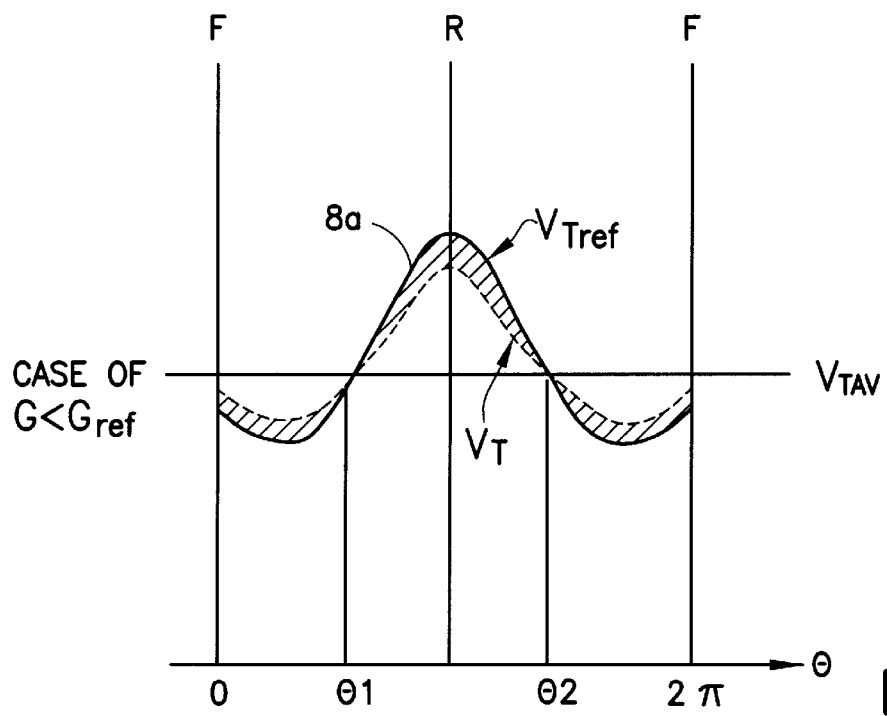
FIG. 5(b) is a waveform chart illustrating the change in the welding voltage of an oscillating arc when the root gap G is smaller than the reference gap $G_{ref}$ in a case of the oscillating arc welding.
Figure 6:
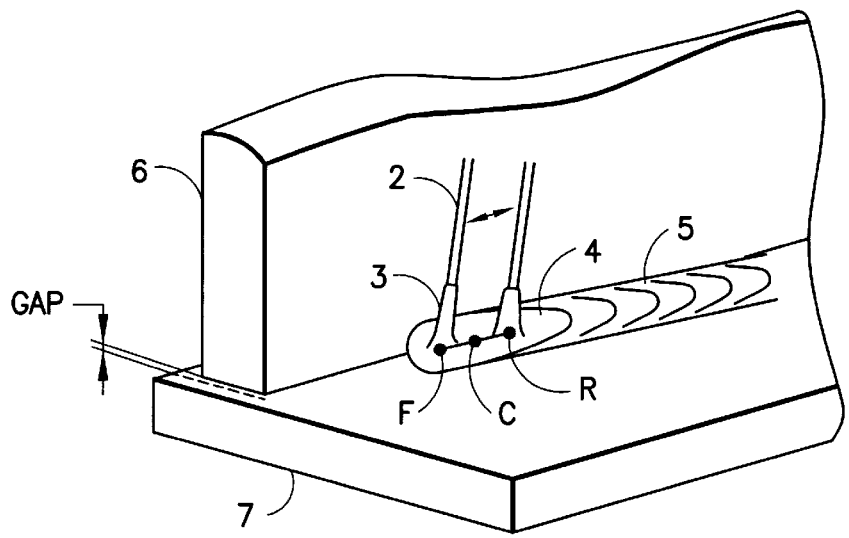
FIG. 6 is a view to define the arc oscillating position.

On the other hand, when the gap G is smaller than $G_{ref}$, $V_T<V_{Tref}$ at R part while $V_T>V_{Tref}$ at other parts as illustrated in FIG. 5(b).

(2) Detecting Method of Differential Waveform $\Delta SG$

The result in FIG. 5 shows that the change in the root gap at a part just below the arc can be detected by detecting the welding voltage waveform, i.e., by the arc sensor system without using any other detector during the welding.

The total area for the deviation part (the shadowed part 8 in FIG. 5) of the present waveform $V_T$ to the reference welding voltage waveform $V_{Tref}$ for one oscillation period of the oscillating arc, can be recognized as the absolute value of the change in the gap to the reference gap $G_{ref}$. Further, $G>G_{ref}$ can be judged when the sign of the integrated value of the deviation part of the voltage waveform at the phase θ1~θ2 (R part) is positive, and G<$G_{ref}$ when the sign is negative. Not the instantaneous value but the integrated value of the voltage waveform is adopted to prevent the effect of the harmonic noise caused by the welding arc phenomenon as described above.

In the above-described explanation, the voltage waveform is used, but it goes without saying that the current waveform can also be used from the well-known principle of the arc sensor.

(3) How to Obtain the Differential Waveform ΔSG

The total area |ΔSG| of a shadowed part 8a in FIG. 5 is described by the same formula as the formula (1).

$$|\Delta SG| = \int_0^{2\pi} |V_T - V_{Tref}| d\theta \quad (5)$$

The integrated value $I_R$ of the deviation part at R part is described by the same formula as the formula (2).

$$I_R = \int_{\theta 1}^{\theta 2} (V_T - V_{Tref}) d\theta \quad (6)$$

Thus, the positive and negative of ΔSG can be determined from the sign of $I_R$. That is, If $I_R > 0$, ΔSG>0
If $I_R < 0$, ΔSG<0
Therefore,
If $I_R > 0$ $$\Delta SG = +\int_0^{2\pi} 51 |V_T - V_{Tref}| d\theta \quad (7)$$

If $I_R < 0$ $$\Delta SG = -\int_0^{2\pi} |V_T - V_{Tref}| d\theta \quad (8)$$

The value of the differential waveform ΔSG can be obtained from the formula (7) and (8). However, in the actual voltage waveform, the phases θ1 and θ2 are fairly fluctuated for each period of the oscillating arc, or the welding condition or the gap value, then it is not easy to detect those phases in process. They are thus given as an approximate value from the result of the practical experiment.

According to said calculation method of ΔSG, the variance of θ1 and θ2 does not affect the value of ΔSG, and the accuracy of detection becomes excellent.

(4) Method for Recognizing the Root Gap

Figure 8:
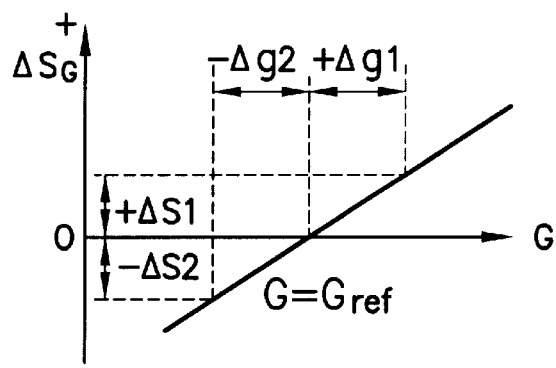
FIG. 8 is a ΔSG–G characteristic diagram illustrating the relationship between the differential waveform Δ SG and the root gap G.

It is experimentally confirmed that the value of ΔSG obtained by the formula (7) corresponds to the change in the gap, and is in an approximately linear relationship to the root gap G as illustrated in FIG. 8. The ΔSG–G characteristic curve is obtained in achieving the welding under an appropriate condition at G=$G_{ref}$. Thus, the present root gap can be recognized from the value of ΔSG.

3. In a Case of Tandem Arc Welding

The tandem arc welding means "welding by longitudinally arranged electrodes", and each electrode has its own independent welding power supply, and is electrically independent. The welding condition (current, voltage) of each electrode and the distance between electrodes are selected according to an object to be welded. Those electrode are mechanically arranged in one body, and travel together (the welding speed becomes same). Generally, the two-electrode welding is popular, but 3 to 6 electrodes are also used in some cases (one side welding, fillet welding, etc. in shipbuilding industry). Four to six electrodes are used in the tube-manufacturing welding, etc. of UOE.

Figure 9:
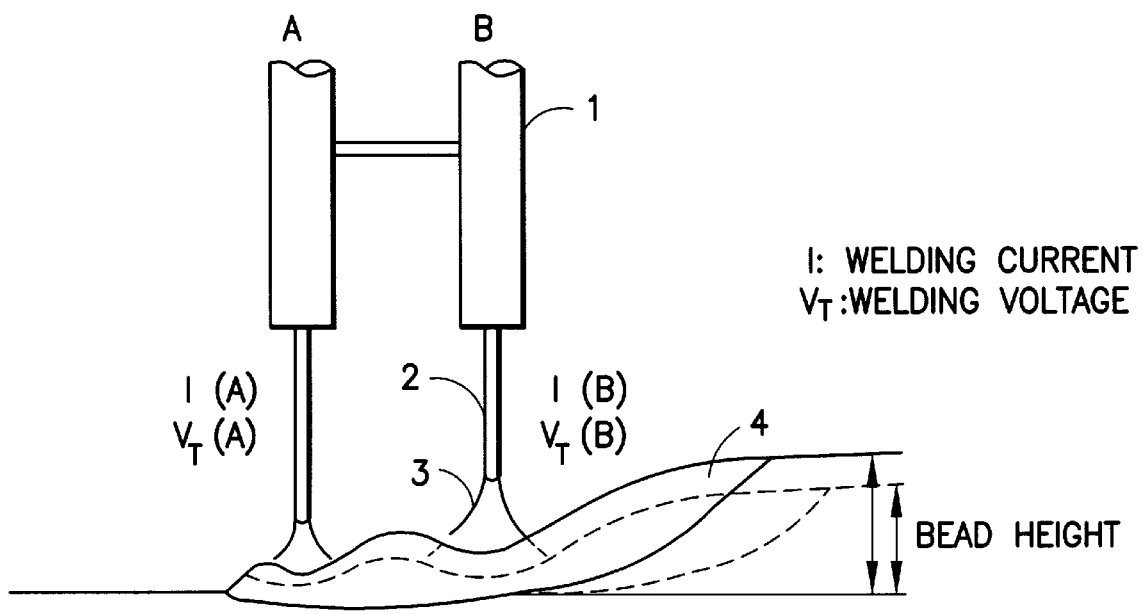
FIG. 9 is a schematic representation illustrating the condition where the shape of the molten pool is changed as the gap is changed in a case of the tandem arc welding.
Figure 10:
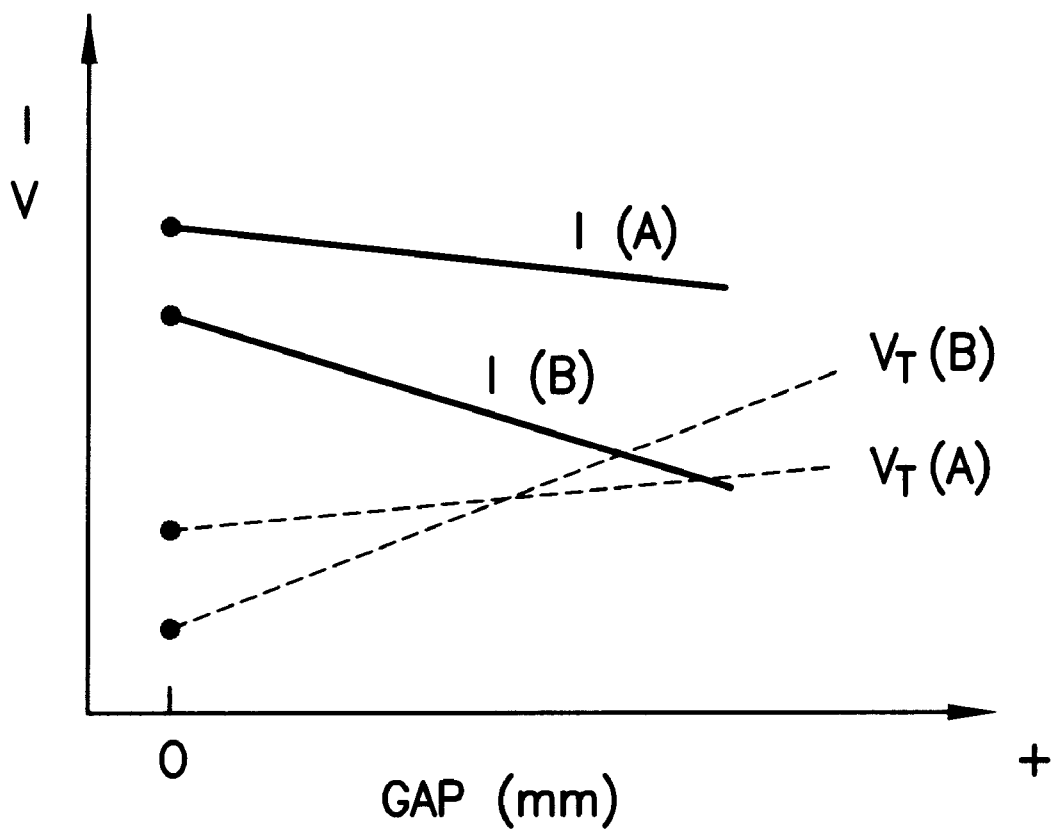
FIG. 10 is a waveform diagram illustrating the change in the welding voltage and the welding current of each electrode when the gap is changed in a case of the tandem arm welding.

FIG. 9 shows the case of the two-electrode tandem arc welding, and FIG. 10 shows the changes in the welding current I and the welding voltage $V_T$ of each electrode to the change in the root gap G. In the figures, A denotes a leading electrode, and B denotes a trailing electrode.

When the root gap is changed (increased), the level of the molten pool 4 is lowered as illustrated in FIG. 9 similar to the cases of the rotary arc and the oscillating arc, and the bead height is decreased. Thus, the current (the voltage) of the electrode A and the electrode B is decreased respectively (increased), but the change in the current (the voltage) of the electrode B with higher molten metal head is larger than that of the electrode A (refer to FIG. 10). The root gap is detected by paying attention to the change in the waveform of the welding current or the welding voltage to be detected by the arc sensor of the succeeding electrode. In a case of multiple electrodes of more than three electrodes, the trailing electrode means the electrode at the tail, or a rear electrode close thereto.

In the aspect of the control, similar to the case of the rotating arc and the oscillating arc, T is equivalent to one period of the rotating arc and the oscillating arc where T assumes the sampling period of the current (voltage) waveform. Thus, from the characteristic curve in FIG. 10, the sampling waveform of, e.g., welding voltage $V_T$ relative to the change in the gap G is given in FIG. 11. The sampling waveform of the current I is reverse to that of the voltage.

Figure 11A:
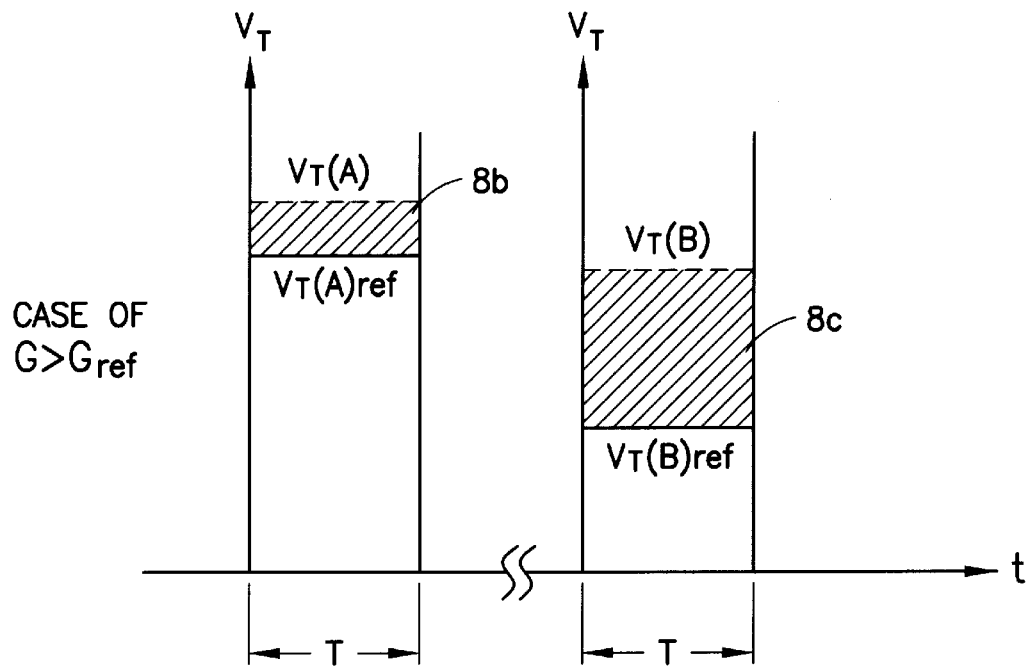
FIG. 11(a) is a schematic representation of a method for obtaining the differential area of the sampling waveform in a case of the tandem arc welding where the root gap G is larger than the reference gap $G_{ref}$.
Figure 11B:
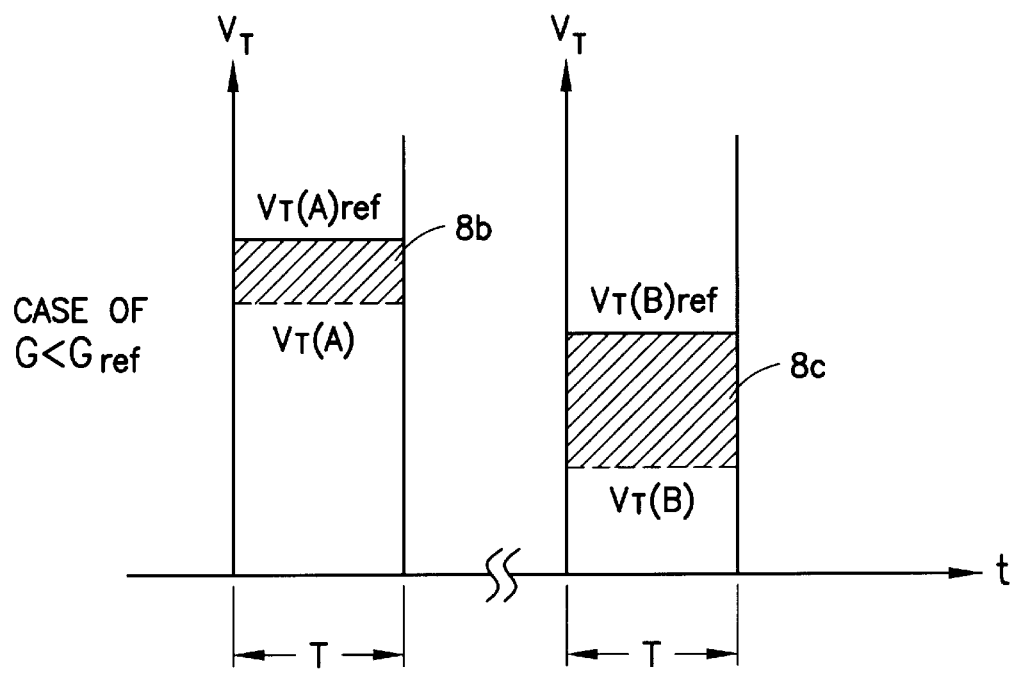
FIG. 11(b) is a schematic representation of a method for obtaining the differential area of the sampling waveform in a case of the tandem arc welding where the root gap G is smaller than the reference gap $G_{ref}$.

Thus, the total area |ΔSG| of shadowed parts 8b and 8c in FIG. 11 is given by the formula (9).

$$|\Delta SG| = \int_0^T |V_T(A) - V_T(A)ref| dt + \int_0^T |V_T(B) - V_T(B)ref| dt \quad (9)$$

The integrated value $I_B$ of the deviation part at the electrode B is given by the formula (10).

$$I_B = \int_0^T |V_T(B) - V_T(B)ref| dt \quad (10)$$

Thus, the positive and negative of ΔSG can be determined from the sign of $I_B$. That is, If $I_B > 0$, ΔSG>0
If $I_B < 0$, ΔSG<0
Therefore,
If $I_B > 0$ $$\Delta SG = +\int_0^T |V_T(A) - V_T(A)ref| dt + \int_0^T |V_T(B) - V_T(B)ref| dt \quad (11)$$

If $I_B < 0$ $$\Delta SG = -\int_0^T |V_T(A) - V_T(A)ref| dt - \int_0^T |V_T(B) - V_T(B)ref| dt \quad (12)$$

The value of ΔSG obtained by the formula (11) is in an approximately linear relationship to the root gap G similar to those in FIGS. 4 and 8 though the relationship is not shown in the figure. Thus, the present root gap can be recognized from the value of ΔSG.

Figure 12:
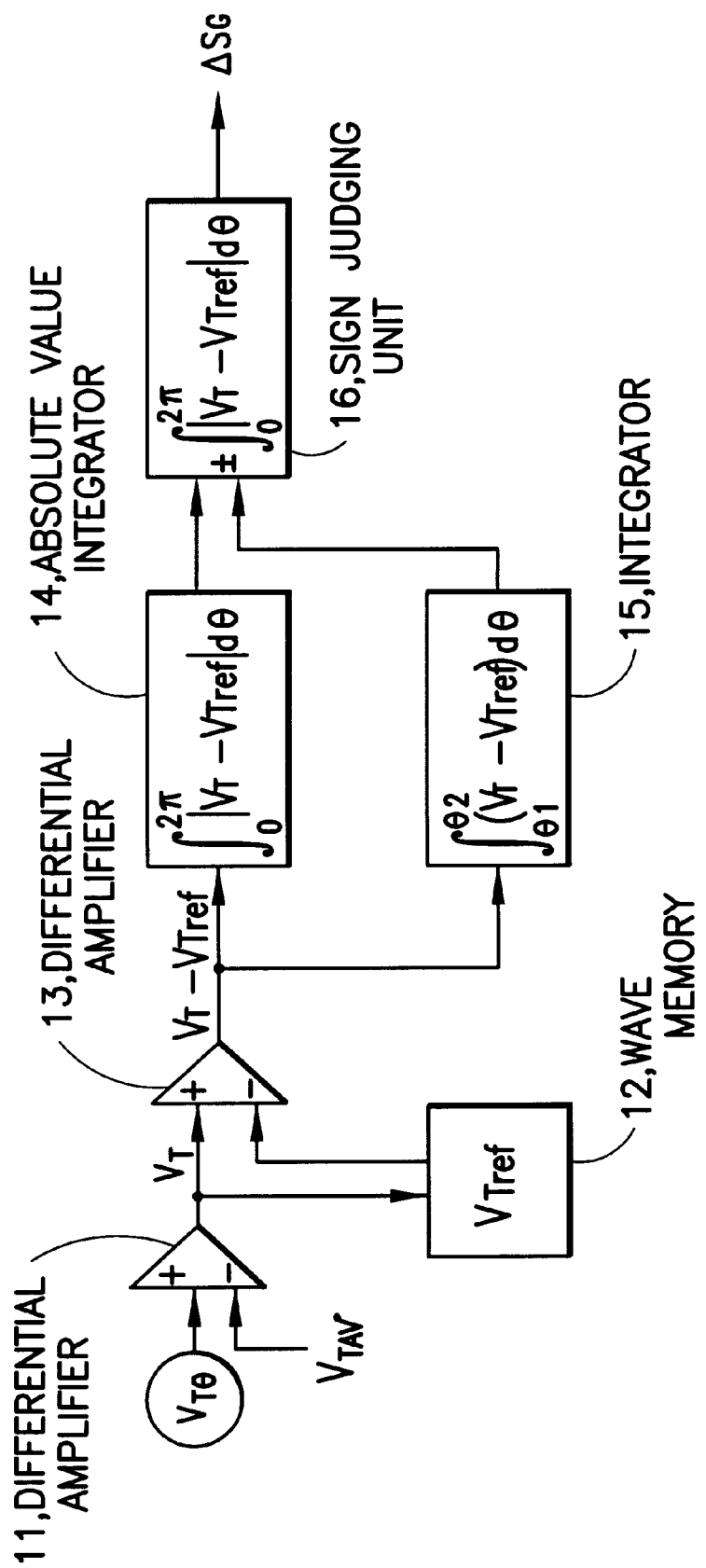
FIG. 12 is a block diagram of a detection circuit of the differential waveform ΔSG in a root gap detecting method of the present invention.

FIG. 12 is a block diagram illustrating an example of a detection circuit of the differential waveform ΔSG to be used in the root gap detecting method of the present invention. The detection circuit is of the same constitution in the high-speed rotating arc welding, the oscillating arc welding and the tandem arc welding. Thus, the case of the high-speed rotating arc welding is mainly described, and supplementary description will be made to the other arc welding as necessary.

In FIG. 12, 11 denotes a differential amplifier to amplify the deviation between the present welding voltage $V_{T0}$ detected by the arc sensor and the average voltage $V_{TAV}$ while the weld seam tracking control and the torch height control are carried out, 12 denotes a waveform memory in which the data of the reference welding voltage waveform $V_{Tref}$ is stored, 13 denotes a differential amplifier to amplify the deviation between the output $V_T$ of the differential amplifier 11 and the reference output $V_{Tref}$ of the waveform memory 12, 14 denotes an absolute value integrator to integrate the right side of the fore-described formula (1), 15 denotes an integrator to integrate the right side of the fore-described formula (2), and 16 denotes a sign judging unit to judge the positive or negative of the sign of $\Delta SG$ by the fore-described formulae (3) and (4).

In the $\Delta SG$ detection circuit, the present welding voltage $V_{T0}$ detected by the arc sensor and the average voltage $V_{TAV}$ under an appropriate welding condition to the reference gap $G_{ref}$ are inputted in the differential amplifier 11 when the welding is achieved while the weld seam tracking control and the torch height control are achieved by the arc sensor of the high-speed rotating arc welding (in the case of the oscillating arc welding and the tandem arc welding, the torch height control is achieved by the arc sensor, and the weld seam tracking control is achieved by another sensor), and the differential amplifier 11 outputs those subtraction value $V_T$. The output $V_T$ is input in the differential amplifier 13, and the data of the reference voltage $V_{Tref}$ corresponding to the reference gap $G_{ref}$ stored in the waveform memory 12 is taken out, and the data is input in the differential amplifier 13. In addition, the output $(V_T - V_{Tref})$ of the differential amplifier 13 is input in the absolute value integrator 14 and the integrator 15 respectively, the output $(V_T - V_{Tref})$ of the differential amplifier 13 is converted to the absolute value in the absolute value integrator 14, and the right side of the fore-described formula (1) (the formula (5) or the formula (9)) is integrated to obtain the total differential area $|\Delta SG|$ of the waveform for one rotation of the arc rotation (for one period of the arc oscillation in the case of the oscillating arc welding, or one sampling period of the arc of each electrode in the case of the tandem arc welding). On the other hand, the right side of the above-described formula (2) (the formula (6) or the formula (10)) is integrated by the integrator 15 to obtain the differential area $I_{cr}$ ($I_R$ or $I_B$) only for the range of the phase $\theta 1 \sim \theta 2$ (the sampling period T of the trailing electrode in the case of the tandem arc welding) at Cr part (R part). These integrated values are transmitted to the sign judging unit 16, the positive or negative of the sign is judged by the fore-described formula (3) and (4) (the formulae (7) and (8), or the formula (11) and (12)), and the positive $\Delta SG$ is output if $G > G_{ref}$, or the negative $\Delta SG$ is output if $G < G_{ref}$, respectively.

Because the differential waveform $\Delta SG$ can thus be detected, it can be recognized in process by the sign of $\Delta SG$ whether the present gap G is larger or smaller than the reference gap $G_{ref}$, or kept equal to the reference gap $G_{ref}$ by experimentally obtaining the relationship between the root gap G and $\Delta SG$ in advance. Further, because the welding can be achieved by changing the welding condition into an appropriate one suitable for the present gap G from the calculation result of $\Delta SG$, the welding condition adaptive control to meet the change in the root gap can be achieved.

As described above, the present invention is capable of recognizing the change of the root gap just below the arc during the welding only by the information on the welding voltage or the welding current by the arc sensor in the high-speed rotating arc welding method, the oscillating arc welding method in which the welding torch is oscillated in the welding direction, or the tandem arc welding method without using any detector in the vicinity of the welding torch, and capable of detecting in process the change in the root gap important in keeping the welding quality in the arc welding.

Then, the welding condition control method by detecting the root gap is described.

In the welding condition adaptive control method of the present invention, the allowable range $+\Delta g1$, $-\Delta g2$ of the gap G is determined by the weld bead shape, the bead height, the leg length or the penetration when the welding is achieved under an appropriate welding condition to $G=G_{ref}$, the allowable range $+\Delta S1$, $-\Delta S2$ of $\Delta SG$ is obtained for $\Delta SG$ detected by the above-described method from the above-described $\Delta SG$–G characteristic curve, and when $\Delta SG$ is within the above-described allowable range, the welding is achieved without changing the welding method, and when $\Delta SG$ reaches the above-described allowable range, the welding condition is changed to an appropriate welding condition obtained in advance for $G=G_{ref}+\Delta g1$ or $G=G_{ref}-\Delta g2$.

The control method of the welding condition by recognizing the root gap is described below.

Figure 13:
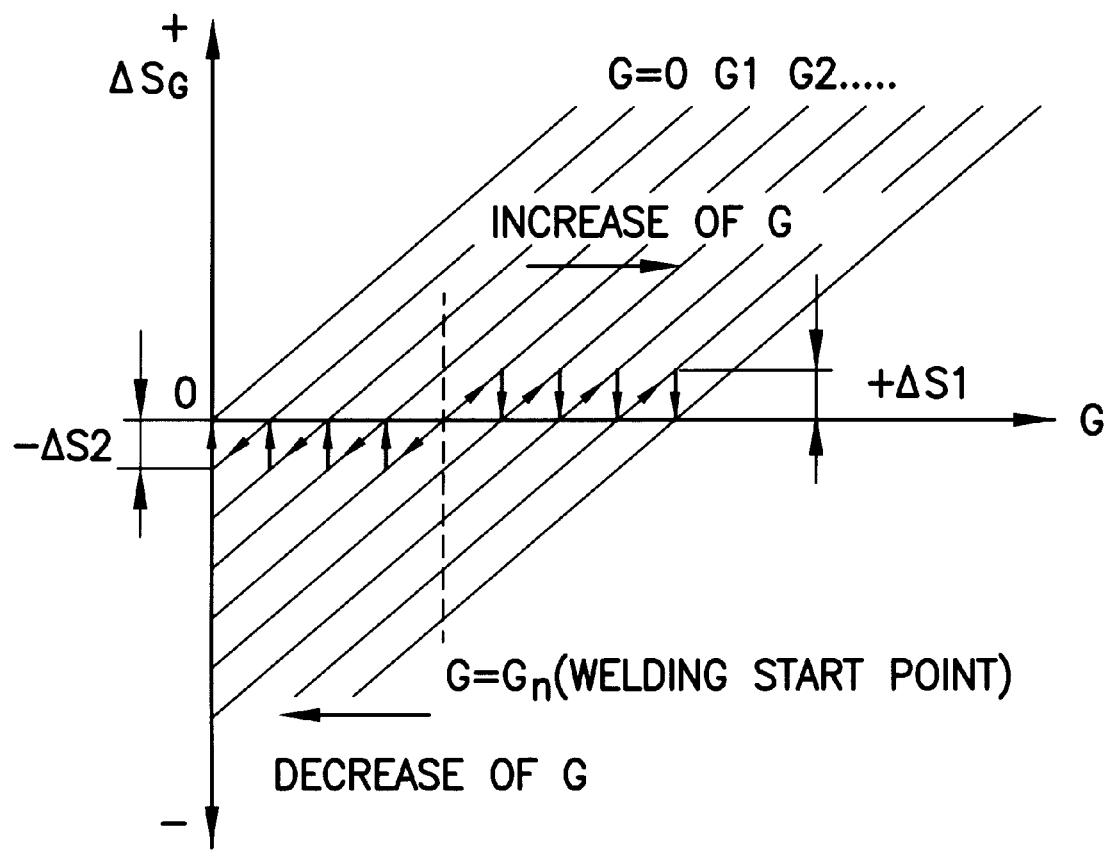
FIG. 13 is a waveform chart illustrating the change in the differential waveform ΔSG due to the increased/decreased root gap.

When the allowable range of the gap where the weld bead shape, the penetration of the weld bead, the bead height, the leg length, etc., to be obtained under an appropriate welding condition of $G=G_{ref}$ can be appropriately obtained, is set to be $+g1$ and $-g2$, the allowable range of the differential waveform output $\Delta SG$ can also be obtained as $+\Delta S1$ and $-\Delta S2$ as illustrated in FIG. 13. Thus, when the $\Delta SG$ reaches the range, the welding condition is changed into an appropriate one to $G=(G_{ref}+\Delta g1)$ or $(G_{ref}-\Delta g2)$.

FIG. 13 indicates the change in $\Delta SG$ output waveform when the welding is started at G=Gn, and then, the gap is increased or decreased by a bold solid line.

Thus, an appropriate welding-condition can be immediately changed and applied during the welding to the change in the gap G, and a welding joint of constantly stable excellent quality can be obtained irrespective of the presence of the gap.

Figure 14:
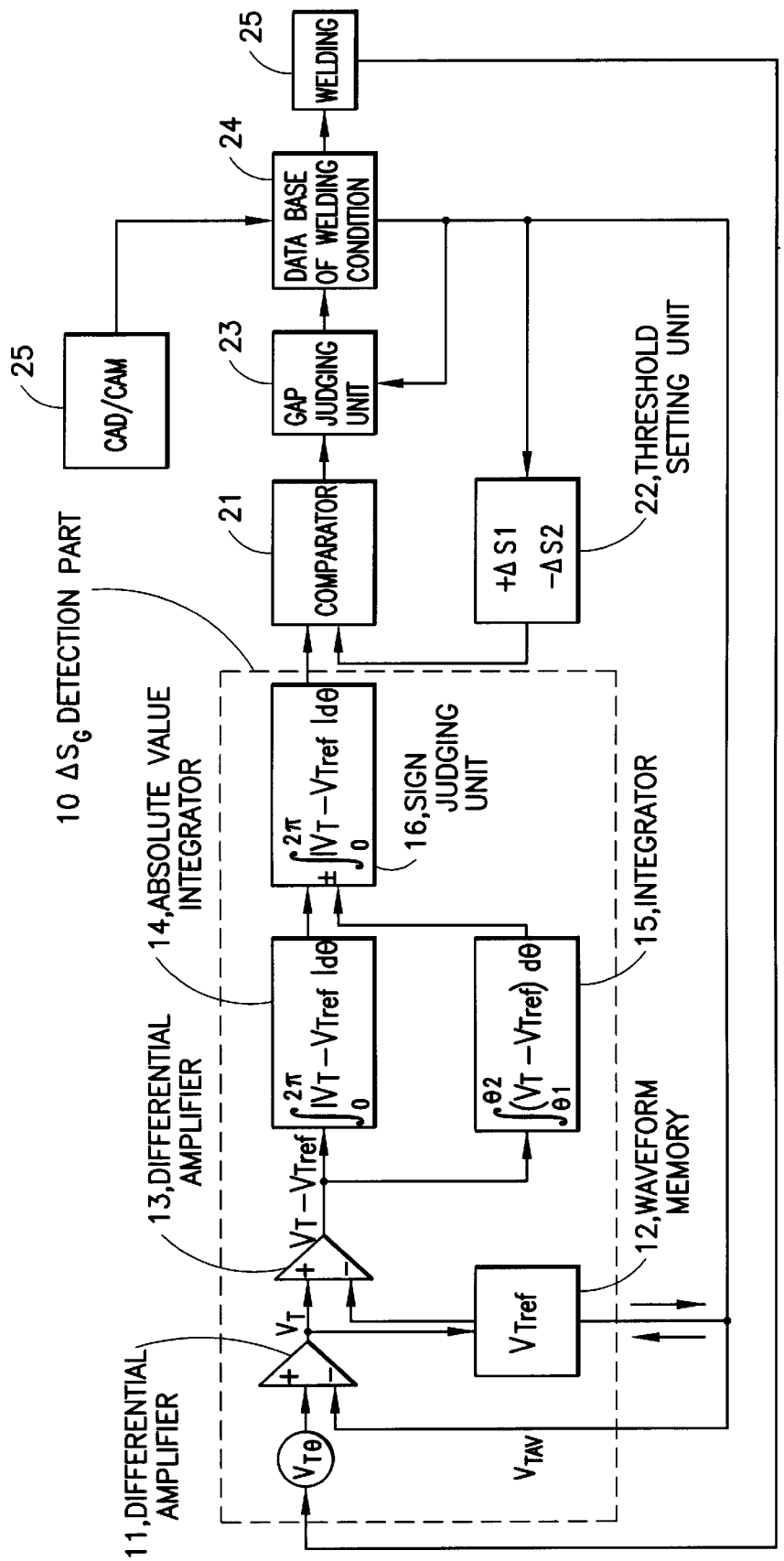
FIG. 14 is a block diagram of a control circuit to be used in an adaptive control method of welding condition in the present invention.

FIG. 14 is a block diagram illustrating an example of a control circuit to be used in the adaptive control method of welding condition of the present invention.

In FIG. 14, 11 denotes a differential amplifier to amplify the subtraction between the present welding voltage $V_{T0}$ detected by the arc sensor and the average voltage $V_{TAV}$ under the weld seam tracking control and the torch height control, 12 denotes a waveform memory in which the data of the reference welding voltage waveform $V_{Tref}$ is stored, 13 denotes a differential amplifier to amplify the subtraction between the output $V_T$ of the differential amplifier 11 and the reference output $V_{Tref}$ of the waveform memory 12, 14 denotes an absolute value integrator to integrate the right side of the fore-described formula (1), 15 denotes an integrator to integrate the right side of the fore-described formula (2), and 16 denotes a sign judging unit to judge the positive and negative of the sign of $\Delta SG$ by the fore-described formulae (3) and (4). A $\Delta SG$ detection part 10 of the control circuit comprises the differential amplifier 11, the waveform memory 12, the differential amplifier 13, the absolute value integrator 14, the integrator 15, and the sign judging unit 16.

21 denotes a comparator to compare the output $\Delta SG$ of the $\Delta SG$ detection part 10 with the allowable range $\Delta S1$, $-\Delta S2$ preset for $\Delta SG$, 22 denotes a threshold setting unit to set the allowable range $\Delta S1$, $-\Delta S2$, 23 denotes a gap judging unit to judge whether or not the gap G is appropriate based on the output of the comparator 21, 24 denotes the database of the appropriate welding condition input from a CAD/CAM system 25 or to be given from this system, and the welding condition database 24 stores the appropriate welding condition data, including optimun value of welding current, welding voltage, welding speed and wire feed speed, which are selected to keep the optimum weld bead shape, the penetration of the weld bead, the bead height, the leg length and the fore-described $\Delta SG$–$G$ characteristic curve, and the allowable range of $\Delta SG$ (+$\Delta S1$, −$\Delta S2$).

In the $\Delta SG$ detection part 10, the present welding voltage $V_{T0}$ detected by the arc sensor and the average voltage $V_{TAV}$ under an appropriate welding condition to the reference gap $G_{ref}$ are inputted in the differential amplifier 11 when the welding is achieved while the weld seam tracking control and the torch height control are achieved by the arc sensor of the high-speed rotating arc welding, and the differential amplifier 11 outputs its subtraction $V_T$. The output $V_T$ is inputted in the differential amplifier 13, and the data of the reference voltage $V_{Tref}$ corresponding to the reference gap $G_{ref}$ stored in the waveform memory 12 is taken out, and the data is input in the differential amplifier 13. In addition, the output ($V_T$−$V_{Tref}$) of the differential amplifier 13 is input in the absolute value integrator 14 and the integrator 15 respectively, the output ($V_T$−$V_{Tref}$) of the differential amplifier 13 is converted to the absolute value in the absolute value integrator 14, and the right side of the fore-described formula (1) is integrated to obtain the total differential area $|\Delta SG|$ of the waveform for one rotation of the arc rotation. On the other hand, the right side of the fore-described formula (2) is integrated by the integrator 15 to obtain the differential area $I_{cr}$ only for the range of the phase $\theta 1$~$\theta 2$ at Cr part. These integrated values are transmitted to the sign judging unit 16, the positive and negative of the sign is judged by the fore-described formulae (3) and (4), and the positive $\Delta SG$ is outputted if $G>G_{ref}$, or the negative $\Delta SG$ is outputted if $G<G_{ref}$, respectively.

In addition, the output $\Delta SG$ of the $\Delta SG$ detection part 10 is input in the comparator 21, and compared with the allowable range +$\Delta S1$, −$\Delta S2$, and the result of comparison is input in the gap judging unit 23. In the gap judging unit 23, the signal as an appropriate gap when $\Delta SG$ is within the allowable range, or the signal as an inappropriate gap when $\Delta SG$ reaches the upper limit value +$\Delta S1$ or the lower limit value −$\Delta S2$ of the allowable range, is input in the welding condition database 24, and the high-speed rotating arc welding is achieved with feedback control of the welding condition by the welding condition database 24 so that the welding condition is kept unchanged if the gap is appropriate, or the welding condition is changed to an appropriate one to be applicable of the gap of the next size when the gap reaches the allowable range of $\Delta SG$ of (+$\Delta S1$, $\Delta S2$).

Thus, by experimentally obtaining the relationship between the root gap $G$ and $\Delta SG$ in advance, it can be recognized in process by the sign of $\Delta SG$ whether the present gap $G$ is larger or smaller than the reference gap $G_{ref}$ or kept unchanged from the reference gap $G_{ref}$. Because the welding can be achieved by changing the welding condition into an appropriate one corresponding to the present gap $G$ based on the calculation result of $\Delta SG$, the welding condition adaptive control can be achieved.

As described above, the present invention is characterized in that the change of the root gap just below the arc during the welding can be recognized only by the information on the welding voltage or the welding current by the arc sensor of the high-speed rotating arc welding method without using any detector in the vicinity of the welding torch, and the welding condition can be immediately changed into an appropriate one during the welding corresponding to the change in the root gap, and applied thereto.

Further, because the welding phenomenon is expressed by the mathematical model based on the correlation between the change in the surface shape of the molten pool just below the arc and the change in the root gap, and the feedback control of the appropriate welding condition is achieved, the control system becomes stable, and the control method of the present invention is capable of obtaining a weld joint excellent in stability and quality to meet an actual work.

What is claimed is:

1. A root gap detecting method in an arc welding process, comprising the steps of:
    controlling a weld seam tracking and a welding torch height;
    detecting a waveform of a welding voltage or a welding current of a welding arc;
    storing the waveform of said welding voltage or said welding current under an appropriate welding condition to a reference gap $G_{ref}$ as a reference waveform;
    obtaining the area $|\Delta SG|$ of a deviation part of a detected waveform to said reference waveform;
    obtaining $\Delta SG$ by judging a positive and a negative of $|\Delta SG|$;
    experimentally determining the relationship between the value of $\Delta SG$ and a root gap $G$ in advance; and
    calculating the root gap $G$ from the value of $\Delta SG$.

2. The root gap detecting method according to claim 1, wherein said arc welding process is a high-speed rotating arc welding process, the process to obtain the area $|\Delta SG|$ is to obtain the area $|\Delta SG|$ of the deviation part of the detected waveform to said reference waveform for one rotation of the arc, and the process to obtain $\Delta SG$ is to obtain $\Delta SG$ by judging the positive and negative of a differential waveform $\Delta SG$ from the sign of the integrated value of an deviation part at a rear part of the position of arc rotation.

3. The root gap detecting method according to claim 1, wherein said arc welding process is an oscillating arc welding process to oscillate a welding torch in the welding direction, the process to obtain the area $|\Delta SG|$ is to obtain the area $|\Delta SG|$ of the deviation part of the detected waveform to said reference waveform for one oscillation period of the arc, and the process to obtain $\Delta SG$ is to obtain $\Delta SG$ by judging the positive and negative of a differential waveform $\Delta SG$ by the sign of an integrated value of an deviation part in a rear part of the oscillation period.

4. The root gap detecting method according to claim 1, wherein said arc welding process is a tandem arc welding process, the process to obtain the area $|\Delta SG|$ is to obtain the area $|\Delta SG|$ of the deviation part of the detected waveform to said reference waveform for each sampling period, and the process to obtain $\Delta SG$ is to obtain $\Delta SG$ by judging the positive and negative of a differential waveform $\Delta SG$ by the sign of an integrated value of the deviation part in the sampling period of a trailing electrode.

5. An arc welding method, comprising the steps of:
    controlling a weld seam tracking and a welding torch height;
    detecting a waveform of a welding voltage or a welding current of an arc;
    storing the waveform of said welding voltage or said welding current under an appropriate welding condition to a reference gap $G_{ref}$ as a reference waveform;
    obtaining an area $|\Delta SG|$ of a deviation part of the detected waveform to said reference waveform;
    obtaining $\Delta SG$ by judging a positive and a negative of $|\Delta SG|$;
    experimentally determining the relationship between the value of $\Delta SG$ and a root gap $G$ in advance;
    calculating the root gap $G$ from the value of $\Delta SG$;
    determining allowable ranges +$\Delta g1$, −$\Delta g2$ of the root gap $G$ in achieving the welding under an appropriate welding condition to the reference gap $G_{ref}$;

obtaining allowable ranges $+\Delta S1, -\Delta S2$ of the differential waveform $\Delta SG$ from the relationship between said $\Delta SG$ and G; and changing the welding condition to a preset appropriate welding condition for the gap of $G=G_{ref}+\Delta g1$ or $G=G_{ref}-\Delta g2$ when said $\Delta SG$ is deviated from said allowable range.

6. The root gap detecting method according to claim 5, wherein said arc welding is a high-speed rotating arc welding, the process to obtain the area $|\Delta SG|$ is to obtain the area $|\Delta SG|$ of a deviation part of a detected waveform to said reference waveform for one rotation of a arc, and the process to obtain $\Delta SG$ is to obtain $\Delta SG$ by judging an positive and negative of a differential waveform $\Delta SG$ from the sign of an integrated value of the deviation part at a rear part of the position of arc rotation.

7. The root gap detecting method according to claim 5, wherein said arc welding is an oscillating arc welding to oscillate a welding torch in the welding direction, the process to obtain the area $|\Delta SG|$ is to obtain the area $|\Delta SG|$ of a deviation part of the detected waveform to said reference waveform for one oscillation period of the arc, and the process to obtain $\Delta SG$ is to obtain $\Delta SG$ by judging the positive and negative of a differential waveform $\Delta SG$ by the sign of an integrated value of an deviation part in a rear part of the oscillation period.

8. The root gap detecting method according to claim 5, wherein said arc welding is a tandem arc welding, the process to obtain the area $|\Delta SG|$ is to obtain the area $|\Delta SG|$ of a deviation part of the detected waveform to said reference waveform for each sampling period, and the process to obtain $\Delta SG$ is to obtain $\Delta SG$ by judging the positive and negative of a differential waveform $\Delta SG$ by the sign of an integrated value of the deviation part in the sampling period of a trailing electrode.

9. The arc welding method according to claim 5, wherein a process to determine the allowable ranges $+\Delta g1, -\Delta \Delta g2$ is to determine the allowable ranges $+\Delta g1, -\Delta g2$ of the root gap G by a weld bead shape, a bead height, a leg length or a penetration.

* * * * *